United States Patent
Elmes et al.

(10) Patent No.: US 8,122,879 B2
(45) Date of Patent: Feb. 28, 2012

(54) ROOF MOUNTED SOLAR COLLECTOR DEVICES WITH CONNECTION PIPING MOVABLE FROM PROTECTED TO INSTALLATION POSITION

(75) Inventors: Stuart Elmes, Cambridge (GB); Kok Thong Tan, Cambridge (GB); Martin Davies, Cambridge (GB)

(73) Assignee: Viridian Concepts Limited, Bassingburn (GB)

( * ) Notice: Subject to any disclaimer, the term of this patent is extended or adjusted under 35 U.S.C. 154(b) by 890 days.

(21) Appl. No.: 11/995,762

(22) PCT Filed: Jul. 14, 2006

(86) PCT No.: PCT/GB2006/002607
§ 371 (c)(1),
(2), (4) Date: Jul. 15, 2008

(87) PCT Pub. No.: WO2007/010205
PCT Pub. Date: Jan. 25, 2007

(65) Prior Publication Data
US 2008/0283044 A1    Nov. 20, 2008

(30) Foreign Application Priority Data
Jul. 15, 2005   (GB) .................................. 0514609.7

(51) Int. Cl.
*F24J 2/04*     (2006.01)
*F24J 2/46*     (2006.01)
(52) U.S. Cl. ........ 126/621; 126/569; 126/623; 126/634; 126/704

(58) Field of Classification Search .......... 126/561–569, 126/621, 622, 623, 634, 704; 215/387, 388, 215/389; 222/153.01, 153.05, 153.06, 153.07, 222/464.1, 464.3, 513, 540, 541.1; 220/707, 220/708, 709, 710, 726; 52/173.3
See application file for complete search history.

(56) References Cited

U.S. PATENT DOCUMENTS

| | | | | |
|---|---|---|---|---|
| 3,303,984 A | * | 2/1967 | Jurena | 229/103.1 |
| 3,332,567 A | * | 7/1967 | Pugh, Sr. | 215/388 |
| 3,486,679 A | * | 12/1969 | Pfahler | 229/103.1 |
| 4,284,065 A | * | 8/1981 | Brill-Edwards | 126/668 |
| 4,406,278 A | * | 9/1983 | Demmer | 126/563 |
| 4,552,125 A | * | 11/1985 | Borodulin et al. | 126/640 |
| 4,560,081 A | * | 12/1985 | Adams | 222/529 |

(Continued)

FOREIGN PATENT DOCUMENTS
DE    93 13 856 U1    11/1993
(Continued)

OTHER PUBLICATIONS

Fintelmann et al., DE 9313856 U1 Description Translation from Espacenet, Nov. 25, 1993, Description Pages.*

*Primary Examiner* — Kenneth Rinehart
*Assistant Examiner* — Joanna Davis
(74) *Attorney, Agent, or Firm* — Sughrue Mion, PLLC

(57) ABSTRACT

A solar collector device for mounting on the outside of a support structure and including a fluid circuit for receiving a fluid for heating by solar radiation, the device further comprising a length of connection piping connected to the fluid circuit and moveable relative to the fluid circuit while thus connected thereto from a protected position to an installation position where the distal end thereof extends to the inside of said support structure.

10 Claims, 2 Drawing Sheets

U.S. PATENT DOCUMENTS

| | | | | |
|---|---|---|---|---|
| 4,991,876 A | * | 2/1991 | Mulvey | 285/21.1 |
| 5,188,283 A | * | 2/1993 | Gu | 229/103.1 |
| 5,330,104 A | * | 7/1994 | Marcus | 239/266 |
| 6,431,434 B1 | * | 8/2002 | Haughton et al. | 229/103.1 |
| 2003/0127089 A1 | * | 7/2003 | Drummond et al. | 126/638 |
| 2004/0164174 A1 | * | 8/2004 | Day | 239/33 |
| 2010/0212658 A1 | * | 8/2010 | Moller | 126/623 |

FOREIGN PATENT DOCUMENTS

| | | |
|---|---|---|
| DE | 44 44 439 A1 | 4/1995 |
| DE | 20 2004 005579 U1 | 7/2004 |
| EP | 1 536 189 A | 6/2005 |

\* cited by examiner

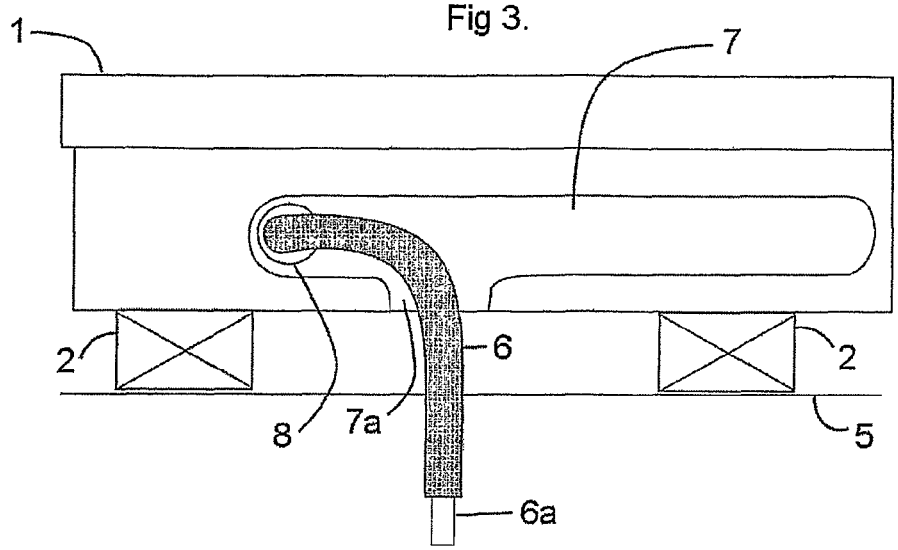
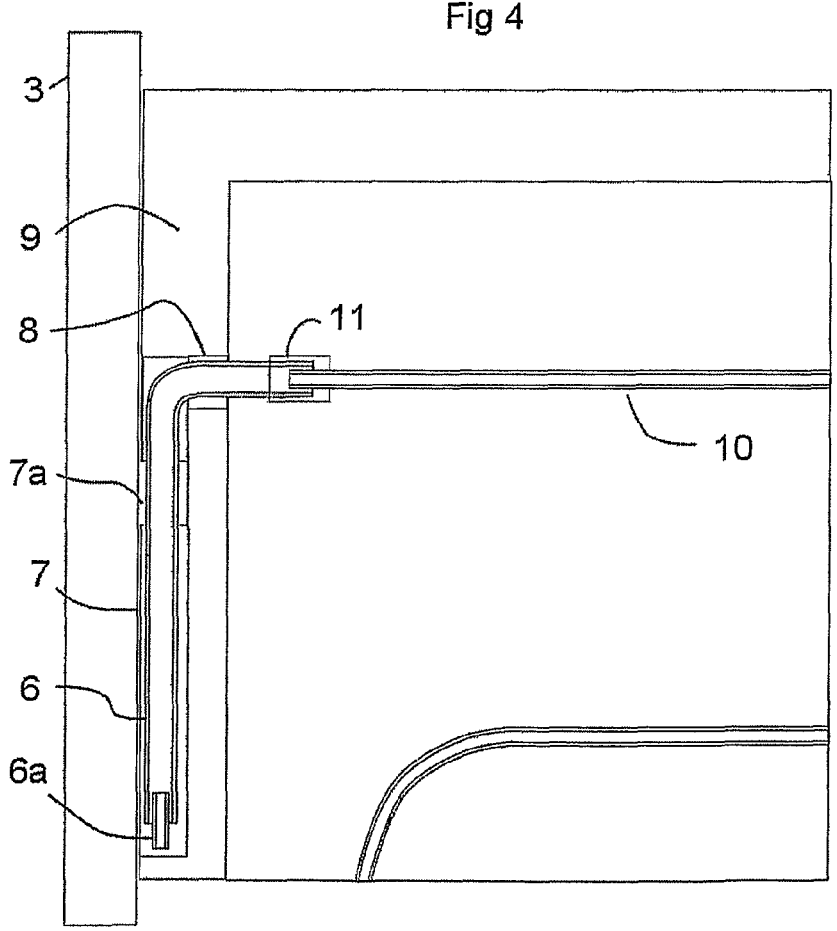

ROOF MOUNTED SOLAR COLLECTOR DEVICES WITH CONNECTION PIPING MOVABLE FROM PROTECTED TO INSTALLATION POSITION

CROSS REFERENCE TO RELATED APPLICATIONS

This application is a National Stage of International Application No. PCT/GB2006/002607 filed on Jul. 14, 2006, claiming priority based on Great-Britain Patent Application No. 0514609.7, filed Jul. 15, 2005, the contents of all of which are incorporated herein by reference in their entirety.

The present invention relates to solar collector devices, such as, for example, solar hot water systems.

Solar hot water systems are simple, proven technology and closer to economic parity with hydrocarbon fuels than many other renewable energy technologies. The focus of past development of products in this area has been primarily upon improvements to the efficiency of systems. Sadly, the result of these efforts has been to produce ever smaller improvements to the energy collected at the penalty of disproportionately higher prices.

Governmental subsidy schemes aimed at encouraging the uptake of renewable energy technology have only partially offset the poor economic case for these systems, and the penetration of the technology into common building practice has been low.

Installation of solar collector panels can make up more than 30% of the cost of the fitted system, even when fitted to new buildings during their construction. The reason for this is that current designs of solar collector panel are not particularly well suited to installation by the tradespeople that are conventionally present on site, and require the presence of specialist installers. This interrupts the flow of work on site and adds to the costs.

Clearly, innovations that enable solar collector panels to be fitted by the relevant tradespeople without the need for special training will reduce the overall costs of solar collector panels, and improve their commercial prospects.

Manufacturers of solar collector panels, being more concerned with retro-fitting to properties, rather than incorporating solar collector panels at the point of construction, have paid little attention to making the connection through the roof simple for non-plumbers.

Solar collector panels typically have couplings protruding from the side of the panel. Once the panel is in place on the roof, pipes are connected to these fittings. Pipe work is then routed through a cut tile or a shaped tile, and then on through the roofing membrane.

Some panels, designed for roof integration have plumbing connections that protrude from the back face of the panel, to fit between the tiling battens, and thereby avoid interference with a side flashing. The disadvantage of this arrangement is that the connector is an impediment to manual handling of the panel, preventing it being slid up the roof and into place on its back face. A further disadvantage is that to connect up either:
(i) the roofing contractor fitting the panel has to make a plumbing attachment, and pass the pipe through the roofing membrane
(ii) the plumber has to go up onto the roof, after the roofer has fit the panel, but before it is tiled around and flashed in.
(iii) the plumber has to make a large penetration through the roofing membrane to find the position of the connector, and make the connection from beneath.

The use of flexible pipework has been proposed as a method of simplifying the fitment of solar panels and routing plumbing around the building. In such systems the flexible pipe is fitted onto the external connector of the solar panel, then pulled into the building. While simplifying the laying of pipes, it still presents the same drawbacks as previously mentioned.

Flexible couplings are also known as a way of connecting multiple solar panels together to allow for the expansion effects of temperature changes. In this prior art, the couplings are of short length, and protrude from the side of the panel, inviting damage in handling.

It is an aim of the present invention to provide a solar collector device with which the above-mentioned problems are resolved but with a reduced risk of damage to the connector prior to installation.

The present invention provides a solar collector device, and a method of installing such a solar collector device.

Hereunder follows a detailed description of embodiments of the invention, by way of example only, with reference to the accompanying drawings, in which:

FIG. 3 is the same view as FIG. 2 showing the connector deployed through the membrane and ready for the plumber to make the connection from within the envelope of the building.

FIG. 4 is a cross sectional view of the connector following the section marked A-A in FIG. 2.

Figure 1:
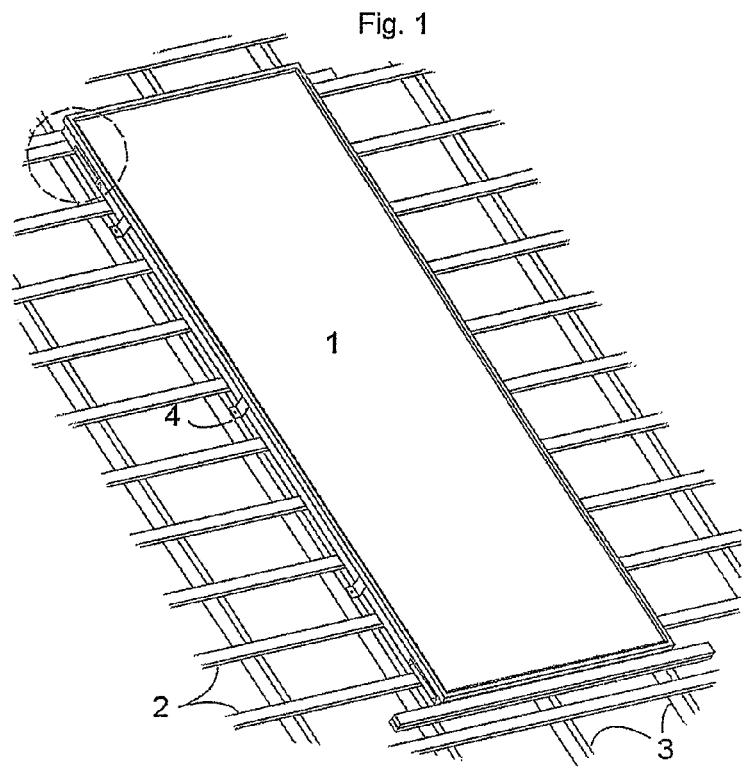
FIG. 1 is a perspective view of a portion of a roof structure (shown without tiles, flashing kit and roofing membrane for clarity), with a solar collector panel according to an embodiment of the present invention shown in position.
Figure 2:
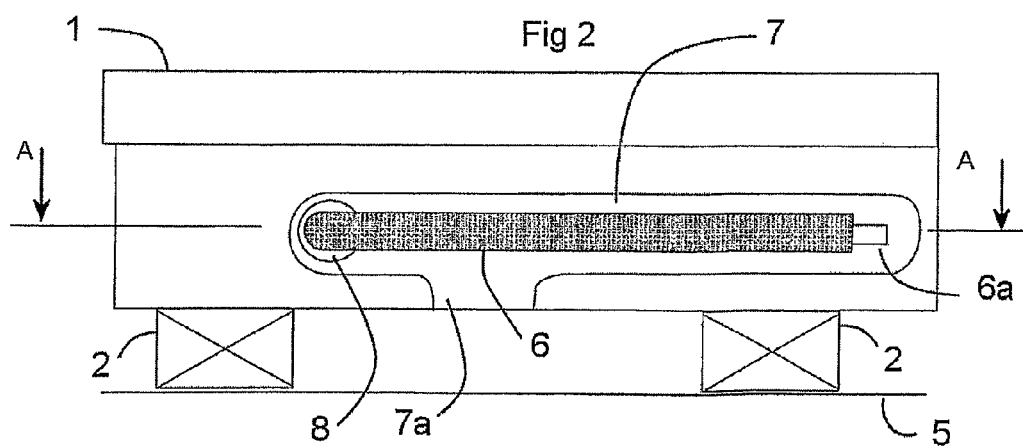
FIG. 2 is a side view of the area of FIG. 1 indicated with a dashed line, showing detail of the improved connector stowed away as delivered.

In the first embodiment of the invention, the solar collector panel 1 integrates onto a conventional roofing structure, comprising rafters 3, membrane 5 over and tiling battens 2. The panel is secured to the rafters with brackets 4.

The roofing tiles (not shown) are arranged over conventional roofing battens 2. A flashing kit (not shown) is provided and interfaces with the solar panel 1 to seal the panel to the roof covering in a weather-tight way.

The outlet from the solar panel is a flexible hose 6, for example a convoluted PTFE hose sleeved in polypropylene braid. Alternative materials for the hose include convoluted copper, convoluted stainless steel, rubber and silicone rubber. The hose has sufficient length (the range of 100-1000 mm and preferably in the range of 200-400 mm) outside the solar panel to be passed through the roofing structure and to allow subsequent connection by the plumber from within the building envelope. This feature advantageously means that the person fitting the panel on the outside face of the roof does not need to make any plumbing connections.

Since all connections that are made on-site are inside the building, they are easily accessible should a poor connection be found at the time of testing and commissioning the system—which may occur long after easy access to the outside of the roof is available.

The hose is connected at the factory to the fluid path within the solar panel. For example, where the fluid path inside the panel 10 is copper pipe, a crimping connector 11 can be used to make a robust connection. This connection can be inside the panel casing.

The flexible hose 6 penetrates the panel casing 9 through a hole 8. The panel casing 9 is provided with an elongated rebate 7 into which the entire length of the flexible hose 6 can be stowed. The rebate acts to protect the hose during shipping and handling on site. With the hose safely tucked away, any temptation to use it as a handle is removed. The rebate is most advantageously situated in the side wall of the panel, where it is accessible once the panel is in-situ. Alternative embodiments include providing the rebate on the rear (lower) face of the panel.

The rebate has an outlet 7a, through which the hose can be bent down to penetrate the roofing structure through the membrane 5. This allows the side flashing to abut the side of the panel, without the hose interfering in a close fit. When the panel width is sized to fit over rafters on a conventional spacing, with the fixing brackets 4 dropping straight onto rafters 3, the rebate 7 and outlet 7a allow the hose to be fed down between the panel side and the rafter.

The outlet 7a could extend the whole length of the rebate 7.

In many solar collector designs, there is a temperature sensor inside the panel. A further advantage of this embodiment is to allow a flying lead from such a sensor to be safely stowed with the hose in the rebate. If the flying lead is attached along the length of the hose, then it is conveniently passed through the roofing structure along with the hose.

The hose could be protected during transit and handling by a tear-off or peel-off cover film that keeps the hose in place until it is time to feed it through the roof.

The hose could be fitted at its free end with any convenient attachment device for use by the plumber inside the building. In the embodiment described, a stub of copper pipe 6a is shown, which has the advantage of passing through a smaller hole in the membrane than for example a compression fitting.

The collector casing 9 is advantageously made in a moulding process, for example from PIR polyurethane foam. The details of the rebate and outlet can thus be moulded in.

The above-described solar panel is simple to fit by the trades present on a building site.

It enables a roofing contractor, not familiar with plumbing connections, to easily present a fluid connection through the weatherproofing membrane in the roof, for later connection by a plumber, from inside the building envelope.

It facilitates the connection of the fluid flow channels in the solar panel to feed and return pipes within the building envelope.

It allows roofing contractors to fit the panel to the roof, and present the connectors to the inside of the building envelope, without making any plumbing connections themselves.

Also the connection piping is kept away from harm during the handling of the solar collector panel as it is brought into position, and a clear planar surface is kept on the rear of the panel so that it can be slid up the roof into position.

It further allows a neat interface of a pressed metal flashing kit to the sides of the solar panel without having to make allowance for the fluid connectors.

In summary, the panel of this embodiment is quickly fitted by traditional tradespeople because of the separation of the above-roof tasks from the plumbing tasks inside the building. The invention enables this separation of skills while at the same time protecting the connector during handling, maintaining a planar back face of the panel allowing it to be slid into place, and providing a route for the connector past the rafter while keeping a neatly fitting side flashing.

The above detailed description of an embodiment of the present invention is provided by way of example only, and various modifications can be made to these embodiments without departing from the scope of the invention.

The applicant draws attention to the fact that the present invention may include any feature or combination of features disclosed herein either implicitly or explicitly or any generalization thereof, without limitation to the scope of any definitions set out above.

The invention claimed is:

1. A solar collector device for mounting on a roof of a building, said roof including a weather-proofing membrane; wherein said solar collector device including a fluid circuit for receiving a fluid for heating by solar radiation, the solar collector device further comprising a length of connection piping connected to the fluid circuit, accessible from a side wall of the solar collector device when the solar collector device is mounted on said roof, and moveable relative to the fluid circuit while thus connected to said fluid circuit from a protected position to an installation position in which the connection piping does not extend beyond said side wall of the solar collector device and in which the distal end of said connection piping extends through said weather-proofing membrane to the inside of said building, wherein the solar collector device includes a casing which is configured to receive the connection piping in the protected position.

2. A solar collector device according to claim 1, wherein the casing houses the fluid circuit and also defines a recess for wholly receiving the connection piping in the protected position.

3. A solar collector device according to claim 2, wherein the solar collector device is in the form of a panel and the connection piping is moveable sideways out of the recess.

4. A solar collector device according to claim 2, wherein the solar collector device is in the form of a panel, and the recess is at least partially open to the rear of the panel whereby the connection piping is moveable into a working position in which it does not extend beyond the sides of the panel.

5. A solar collector device according to claim 2, wherein the casing is a moulded casing.

6. A solar collector device according to claim 2, wherein the recess is provided with a temporary covering removable to allow the connection piping to be moved from the protected position to the working position.

7. A solar collector device according to claim 6, wherein the temporary covering is removable by peeling or tearing.

8. A solar collector device according to claim 1, wherein the connection piping includes a flexible hose.

9. A solar collector device according to claim 8, wherein the connection piping also includes copper piping at the distal end of the flexible hose.

10. A method of installing a solar collector device on a roof of a building, said roof including a weather-proofing membrane, and said solar collector device including a fluid circuit for receiving a fluid for heating by solar radiation, and a length of connection piping connected to the fluid circuit, accessible from a side wall of the solar collector device and moveable relative to the fluid circuit while thus connected to the fluid circuit from a protected position to an installation position where the distal end thereof extends through said weather-proofing membrane to inside of said building, the method comprising: mounting the solar collector device on the outside of said roof with the connection piping pre-connected to the fluid circuit in the protected position before mounting the solar collector on the outside of said roof; thereafter accessing the connection piping from said side wall of the solar collector device, moving the connection piping from the protected position to the installation position in which the connection piping does not extend beyond said side wall of the panel, and in which the distal end thereof extends through said weather-proofing membrane and to the inside of said building; and then connecting the distal end of the connection piping to a source of said fluid inside said building.

* * * * *